United States Patent
Lennon et al.

(12)

(10) Patent No.: US 6,431,570 B1
(45) Date of Patent: Aug. 13, 2002

(54) BICYCLE TRAILER ASSEMBLY

(76) Inventors: Sean Lennon, 1111 Lincoln Road, Windsor Ontario (CA), N84 2H6; Bob Sherman, 227 Hill St., Milford, MI (US) 48381

( * ) Notice: Subject to any disclaimer, the term of this patent is extended or adjusted under 35 U.S.C. 154(b) by 0 days.

(21) Appl. No.: 09/799,392

(22) Filed: Mar. 5, 2001

(51) Int. Cl.$^7$ ................................................. B62K 27/00
(52) U.S. Cl. ...................................... 280/204; 280/292
(58) Field of Search ............................... 280/204, 292, 280/202, 288.4, 656

(56) References Cited

U.S. PATENT DOCUMENTS

| | | |
|---|---|---|
| 2,254,797 A | 9/1941 | Dubay |
| 3,387,859 A | 6/1968 | McClellan |
| 3,792,875 A | 2/1974 | Paden |
| 4,027,899 A | 6/1977 | Hawes |
| 4,077,646 A | 3/1978 | Watkins |
| 4,266,793 A | 5/1981 | Pryor |
| 4,325,564 A | 4/1982 | Phipps |
| 4,342,467 A * | 8/1982 | Kester .......................... 280/204 |
| 4,413,835 A * | 11/1983 | Hazelett ...................... 280/204 |
| 4,511,155 A | 4/1985 | Galloway |
| 4,536,001 A * | 8/1985 | Wagner ........................ 280/204 |
| 4,756,541 A | 7/1988 | Albitre |
| 5,011,170 A | 4/1991 | Forbes |
| 5,098,113 A | 3/1992 | Albitre |
| 5,171,034 A | 12/1992 | Scott |
| 5,427,396 A * | 6/1995 | Gore ........................... 280/204 |
| 5,516,131 A | 5/1996 | Novotny |
| 5,791,670 A | 8/1998 | Hunker |
| 6,042,138 A * | 3/2000 | Shreck ......................... 280/492 |
| 6,182,990 B1 * | 2/2001 | Everett ........................ 280/204 |
| 6,305,703 B1 * | 10/2001 | Quick et al. ................. 280/204 |

FOREIGN PATENT DOCUMENTS

| | | | | |
|---|---|---|---|---|
| CH | 221784 | * | 6/1942 | .................. 280/204 |
| CH | 224819 | * | 12/1942 | .................. 280/204 |
| FR | 867284 | * | 10/1941 | .................. 280/204 |
| FR | 1061663 | * | 4/1954 | .................. 280/204 |
| IT | 502316 | * | 11/1954 | .................. 280/204 |
| NL | 8200468 | * | 9/1983 | .................. 280/204 |

OTHER PUBLICATIONS

BOB Trailers and Strollers; http://www.bobtrailers.com/, Nov. 7, 2000.
Kool Stop Mule; http://www.koolstop.com/trailers/mule.html, Nov. 7, 2000.
Kool Stop Wilderbeast; http://www.koolstop.com/trailers/beast.html, Nov. 7, 2000.

(List continued on next page.)

Primary Examiner—Daniel G. DePumpo
(74) Attorney, Agent, or Firm—Law Offices of John Chupa and Associates, P.C.

(57) ABSTRACT

A bicycle trailer assembly 10 is provided and is adapted for use in an off-road environment. As shown, bicycle trailer assembly 10 includes a front yoke 18, which is pivotally coupled to the frame 14 and rear axle 16 of bicycle 12 by use of a pair of substantially identical ball-type joint assemblies 20. Assembly 10 further includes a cargo support or carrying frame 22 which is pivotally coupled to front yoke assembly 18; a rear yoke assembly 24 which is pivotally coupled to frame 22 and which rotatably supports a trailer wheel 28; and an elastomeric member, shock absorber or damper 26 which is operatively disposed between frame 22 and rear yoke 24. As shown in FIG. 6, the trailer assembly 10 further includes storage compartments or panniers 120 which are selectively and removably attached to support frame 22. The independently supported rear wheel 28 and shock absorber 26 act to substantially reduce vibrations and loads caused by the obstacles or variations typically encountered in an off-road environment, and prevent such vibrations and loads from being transferred to the bicycle 12.

4 Claims, 7 Drawing Sheets

OTHER PUBLICATIONS

Two Plus Two; http://www.twoplustwo.uk.com/gtrailers/index.html, Nov. 7, 2000.
The Tanjor Bicycle Trailer by VMS; http://www.lodrag.com, Nov. 7, 2000.
Bike Cart Age–Bike Trailers; http://www.horizon.bc.ca/~steve/, Nov. 7, 2000.
Doggy Tote; http://www.cycletote.com/doggy tote.html, Nov. 7, 2000.
Products; http://www.wicycle.com, Nov. 7, 2000.
Hystory at Wike; http://www.wicycle.com/hystory.html, Nov. 7, 2000.
Instep Foldable Bicycle Trailer Product Line; http://www.instep.net/instep_web/indexes/rtailer_strolers.html, Nov. 7, 2000.
Bykaboose; http://www.bykaboose.com/trailers, Nov. 7, 2000.
Bicycle R Evolution bike trailers; http://www Bykefriday, Nov. 7, 2000.
Trailer features; http://www.bikesatwork.com/products/features.html, Nov. 7, 2000.
Welcome to a Bikes at Work; http://www.bikesatwork.com, Nov. 7, 2000.
xtracycle:models; http://www.xtracycle.com/xtracycle/models.htm, Nov. 7, 2000.
The camp–A–Saurus; http://www.pacasaurus.com/pacasaurus/campasaurus 1.html, Nov. 7, 2000.
Equinox Tourlitre Bycicle Trailers, Strollers, Ski Sleds & More; http://www.efn.org.com, Nov. 7, 2000.

* cited by examiner

BICYCLE TRAILER ASSEMBLY

FIELD OF THE INVENTION

This invention relates to a bicycle trailer assembly and more particularly, to a bicycle trailer assembly which is adapted for use in an "off-road" environment, which can efficiently transport cargo, and which is effective to damp and/or substantially reduce vibration and loads which are normally transferred from a riding surface to the trailer assembly and bicycle.

BACKGROUND OF THE INVENTION

A bicycle trailer assembly typically includes an armature or yoke which is attached to the bicycle, a load-bearing frame or receptacle for transporting cargo, and one or more relatively small rear wheels which are typically rigidly coupled to the frame or receptacle in a conventional manner. While these types of conventional bicycle trailer assemblies can effectively transport cargo in certain "level" or ordinary riding environments (e.g., on a relatively flat, paved road), they suffer from some drawbacks.

Particularly, these conventional trailers are not well suited for "off-road" type environments, such as those typically traversed with off-road type bicycles or "mountain bikes". That is, when these conventional trailers are used in an off-road environment, such as on a "single-track" or uneven dirt path, they perform relatively poorly. For example and without limitation, because the rear wheels of these conventional trailers are rigidly attached to the frame or receptacle, they directly communicate vibration and movement to the bicycle when they encounter or strike an obstacle, thereby adversely effecting the handling of the bicycle and making the bicycle more difficult to control and drive. Moreover, the relatively small rear trailer wheel(s) will often bounce into the air when hitting a relatively large obstacle, thereby tugging on the bicycle and potentially causing the cargo mounted to the trailer to loosen or fall off of the trailer. These conventional bicycle trailers are further not suited to allow for a relatively "tight" or "sharp" turning radius as may be required and/or often encountered in off-road environments. As a result, the rear wheel(s) of the trailer may leave or veer from the path while the bicycle performs a relatively "sharp" or "tight" turn, thereby slowing the bicycle, and further transferring undesired vibration and loads to the bicycle.

There is therefore a need to provide an improved bicycle trailer assembly which is adapted for use in an off-road environment.

SUMMARY OF THE INVENTION

A first non-limiting advantage of the invention is that it provides a bicycle trailer assembly adapted for use in an off-road environment.

A second non-limiting advantage of the invention is that it provides a bicycle trailer assembly having a load-bearing frame, a rear wheel which is independently suspended from the load-bearing frame, and a shock absorbing member which substantially eliminates and/or reduces the amount of vibrations and/or loads which are transferred from the rear wheel to the load bearing frame and to the bicycle.

A third non-limiting advantage of the invention is that it includes a relatively large independently suspended rear wheel which is effective to remain in substantially continuous contact with the riding surface even in an off-road environment and in the presence of relatively large obstacles.

A fourth non-limiting advantage of the invention is that it includes a semi-spherical ball joint assembly which allows the trailer to be robustly attached to the rear wheel of a bicycle.

According to a first aspect of the present invention, a bicycle trailer assembly is provided for use with a bicycle including a rear wheel having a rear axle. The trailer assembly includes a front yoke having a front portion which is pivotally coupled to the rear axle about a first generally horizontal axis and a rear portion including a steering cross member; a cargo support frame having a front portion which is pivotally coupled to the steering cross member about a generally vertical axis and a rear portion; a rear yoke having a front portion which is pivotally coupled to the rear portion of the cargo support frame about a second generally horizontal axis and a rear portion; at least one wheel which is rotatably coupled to the rear portion of the rear yoke; and at least one resilient element which is disposed between the rear yoke and the cargo support frame and which is effective to damp movement of the rear yoke relative to the cargo support frame.

According to a second aspect of the present invention, a bicycle trailer is provided for use with a bicycle having a rear axle and a frame. The bicycle trailer includes a front yoke having a first portion which is pivotally coupled to the rear axle about a first generally horizontal axis, and a second portion having a generally vertical channel; a steering arm which is rotatably disposed within the generally vertical channel; a support frame having a first portion which is attached to the steering arm, thereby allowing the frame to be rotatable relative to the front yoke about a generally vertical axis, and a second portion having a generally horizontal channel; a pivoting member which is rotatably disposed within the generally horizontal channel; a rear yoke having a first portion which is attached to the pivoting member, thereby allowing the rear yoke to pivot relative to the support frame about a generally horizontal axis, and a second portion; a rear wheel which is rotatably coupled to the second portion; and a shock absorbing member which is operatively coupled to the rear yoke and to the support frame and which is effective to damp movement of the rear yoke relative to the support frame.

These and other objects, aspects, features, and advantages of the present invention will become apparent from a consideration of the following specification and the attached drawings.

BRIEF DESCRIPTION OF THE DRAWINGS

FIG. 7a is an enlarged view of a portion of the bicycle trailer assembly shown in FIG. 7 illustrating the ball joint attachments.

DETAILED DESCRIPTION OF THE PREFERRED EMBODIMENT OF THE INVENTION

Figure 4:
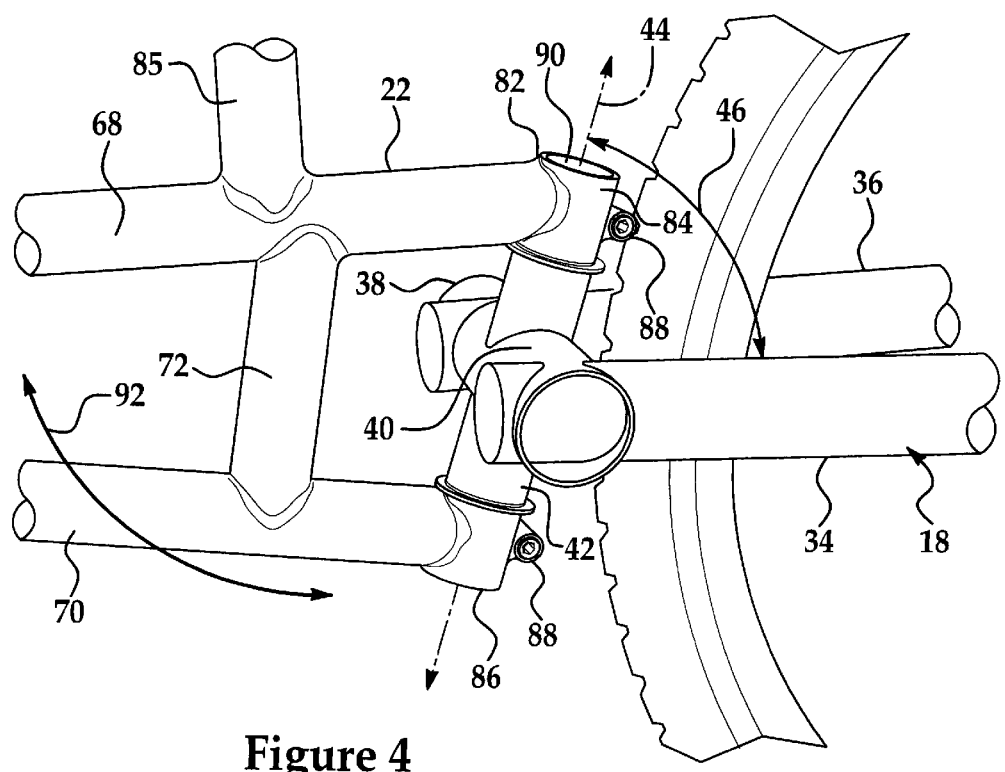
FIG. 4 is a partial perspective view of the bicycle trailer assembly shown in FIG. 1 and illustrating the coupling of the support frame to the front yoke of the trailer assembly.
Figure 5:
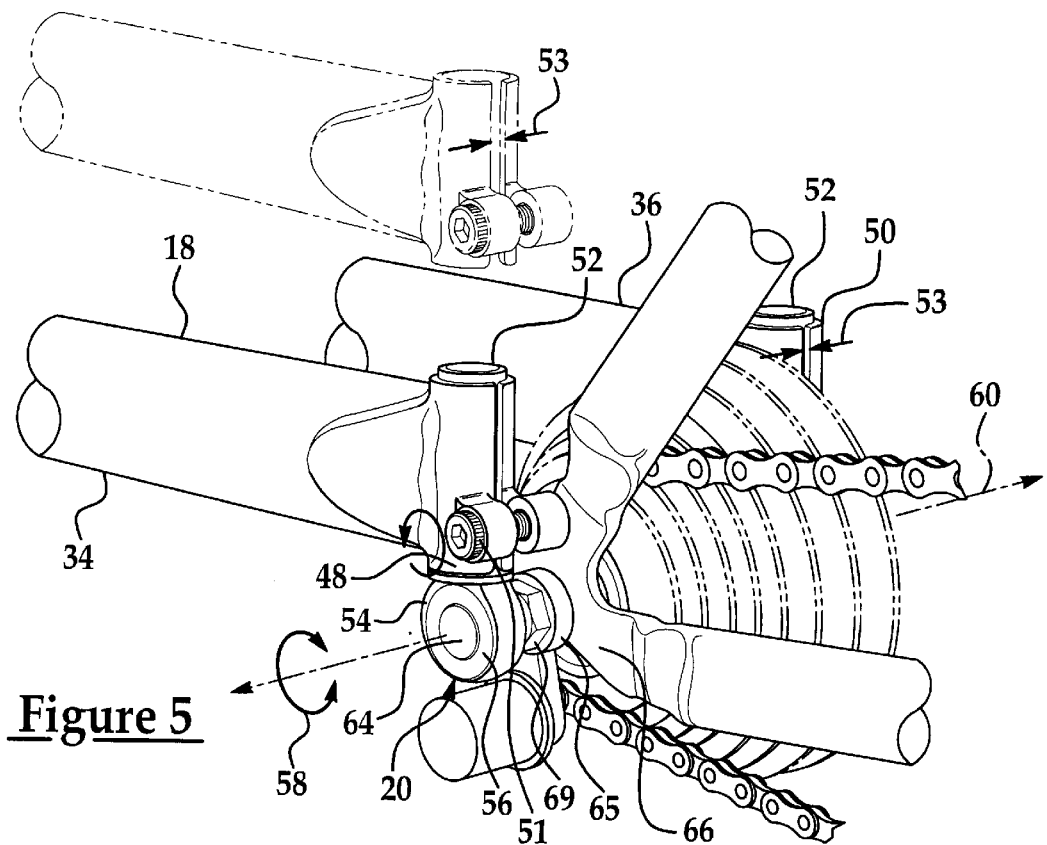
FIG. 5 is a partial perspective view of the bicycle trailer assembly shown in FIG. 1 and illustrating the coupling of the front yoke of the assembly to the bicycle.
Figure 6:
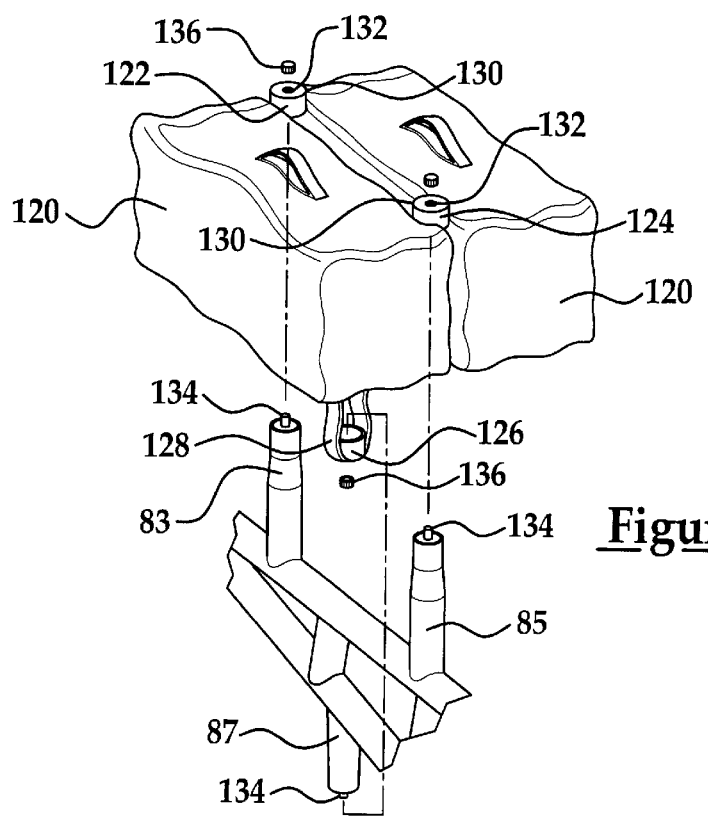
FIG. 6 is a perspective view of a pair of pannier attachments for use with the trailer shown in FIG. 1.

Referring now to FIGS. 1–6, there is shown a bicycle trailer assembly 10 which is made in accordance with the teachings of a first embodiment of the invention and which is adapted for use with a conventional bicycle 12. Particularly, trailer assembly 10 is adapted to be selectively attached to the frame 14 and rear axle 16 of the bicycle 12. As shown, bicycle trailer assembly 10 includes a front yoke 18, which is pivotally coupled to the rear axle 16 of bicycle 12 about a generally horizontal axis 60 by use of a pair of substantially identical ball-type joint assemblies 20; a cargo support or carrying frame 22 which is pivotally coupled to front yoke assembly 18 about a generally vertical "steering" axis 44; and a rear yoke assembly 24 which is pivotally coupled to frame 22 about a generally horizontal axis 112, and which rotatably supports a trailer wheel 28. Trailer assembly 10 further includes an elastomeric member, resilient element, shock absorber or damper 26 which is operatively disposed between frame 22 and rear yoke 24. As shown in FIG. 6, the trailer assembly 10 further includes storage compartments or panniers 120 which are selectively and removably attached to support frame 22.

In a first embodiment of the invention, shown in FIGS. 1–6, front yoke 18, frame 22 and rear yoke 24 are formed and/or manufactured from metal tubing such as steel, aluminum, titanium or alloy tubing. In other alternate embodiments, front yoke 18, frame 22 and rear yoke 24 may be formed from different materials, such as composite and/or polymer materials (e.g., carbon fiber), and may have different shapes based upon the specific structural and functional characteristics of the material used.

Figure 2:
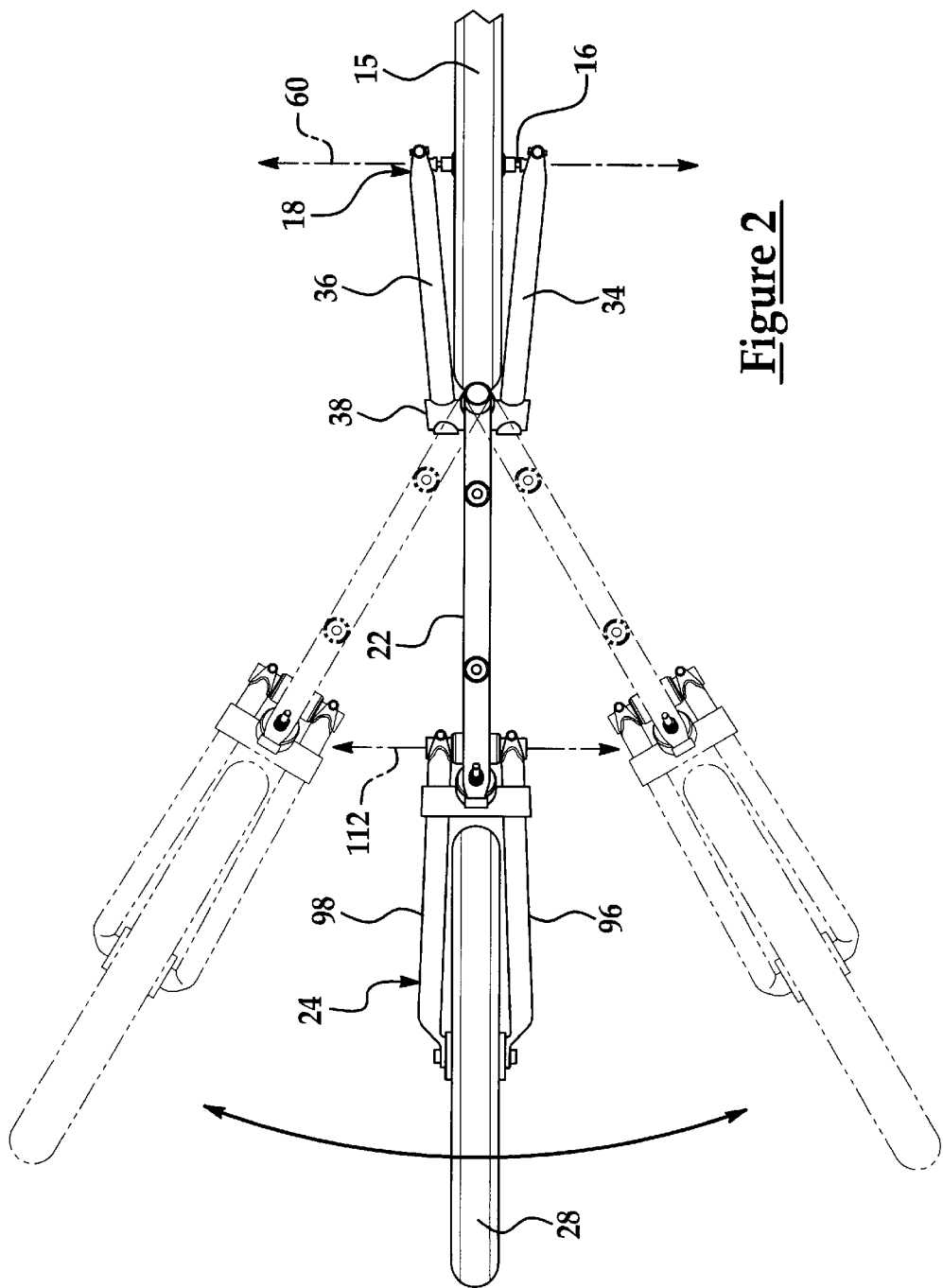
FIG. 2 is a top view of the bicycle trailer assembly shown in FIG. 1.

As shown best in FIGS. 2 and 4, front yoke 18 includes a pair of relatively thick hollow members or tubes 34, 36, which are fixedly coupled in a conventional manner (e.g., welded) to a steering cross member or tube 38 which connects tubes 34, 36. Cross member 38 includes a substantially horizontal member or portion 40 which connects tubes 34, 36 and a generally hollow angled member or portion 42 which is disposed at an acute angle relative to members 34, 36 (i.e., the longitudinal axis 44 of portion 42 is disposed at an angle 46 relative to members 34, 36, which is less than 90 degrees).

As shown best in FIG. 5, the front ends of tubes 34, 36 respectively include split receiver tubes 48, 50 having selectively adjustable gaps 53. Each receiver tube 48, 50 may be selectively tightened and loosened by use of conventional bolt fasteners 51 which allow the diameter of the tubes 48, 50 or the size of gaps 53 to be selectively adjusted (i.e., increased and decreased). Receiver tubes 48, 50 are adapted to fit over rod ends 52 of the ball joint assemblies 20. Once the receiver tubes 48, 50 are placed over the rod ends 52, they may be tightened by use of bolt fasteners 51, effective to secure the front yoke 18 to the rod ends 52.

Rod ends 52 terminate in ball sockets 54 which conformingly and rotatably engage semi-spherical members or ball studs 56, thereby forming ball joints 20. That is, ball sockets 54 ride on ball studs 56, which allow rod ends 52 and front yoke 18 to pivot relative to ball studs 56 and relative to the axle 16 of bicycle 12 (e.g., yoke 18 pivots about axis 60 of axle 16) in the directions of arrows 58. The diameter of members 56 and sockets 54 can be selectively adjusted to either "tighten" or "loosen" the joint 20.

Figure 9:
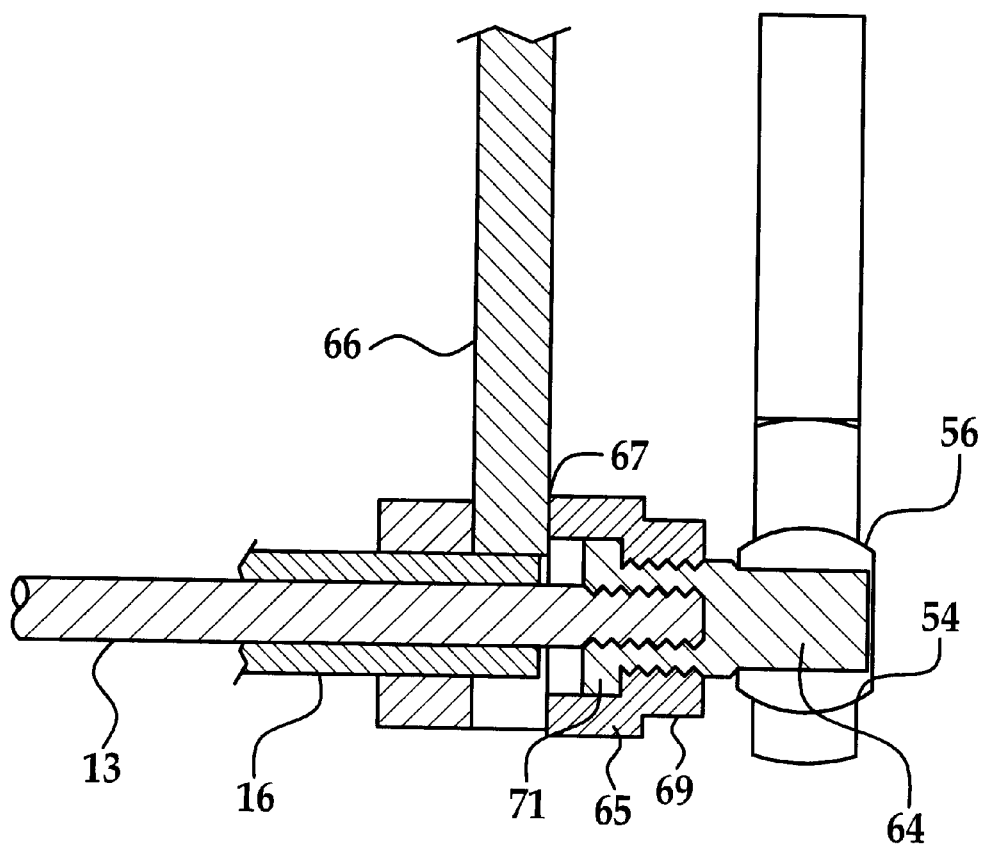
FIG. 9 is a sectional view of a ball joint attachment for use with the bicycle trailer assemblies shown in FIG. 1 and 7.

In the preferred embodiment, ball studs 56 are fixedly coupled to the rear axle 16 of the bicycle by use of a draw pin and skewer assembly, as shown best in FIG. 9. Particularly, each ball stud 56 is press-fitted to the cylindrical end of a draw pin 64. Each draw pin 64 is threadingly secured to an end of the axle draw bolt 13. A hollow skewer 65 fits over and threadingly engages the outside threaded surface of draw pin 64. The hollow skewer 65 is screwed down until it engages the flange 71 of the draw pin 64, thereby tensioning the draw bolt 13. Skewer 65 includes a widened base portion 67 which abuttingly engages frame portion 66 when the skewer 65 is tightened, thereby diverting axial and torsional loads which are imparted upon the draw pin 64 from the ball joint assembly 20. In this manner frame 66 is allowed to absorb loads which might otherwise damage, fatigue or deform the axle draw bolt 13. Skewer 65 also includes a hexagonal outer surface portion 69 which allows the skewer 65 to be tightened and loosened from frame portion 66 by use of a conventional wrench. It should be appreciated that by tightening and loosing skewers 65, the rear wheel 15 of the bicycle 12 can be selectively secured to and removed from the frame 14 (i.e., from frame or fork portion 66). In other alternate embodiments, members 56 may be coupled to or otherwise adapted for use with a conventional quick wheel release skewer assembly.

Figure 1:
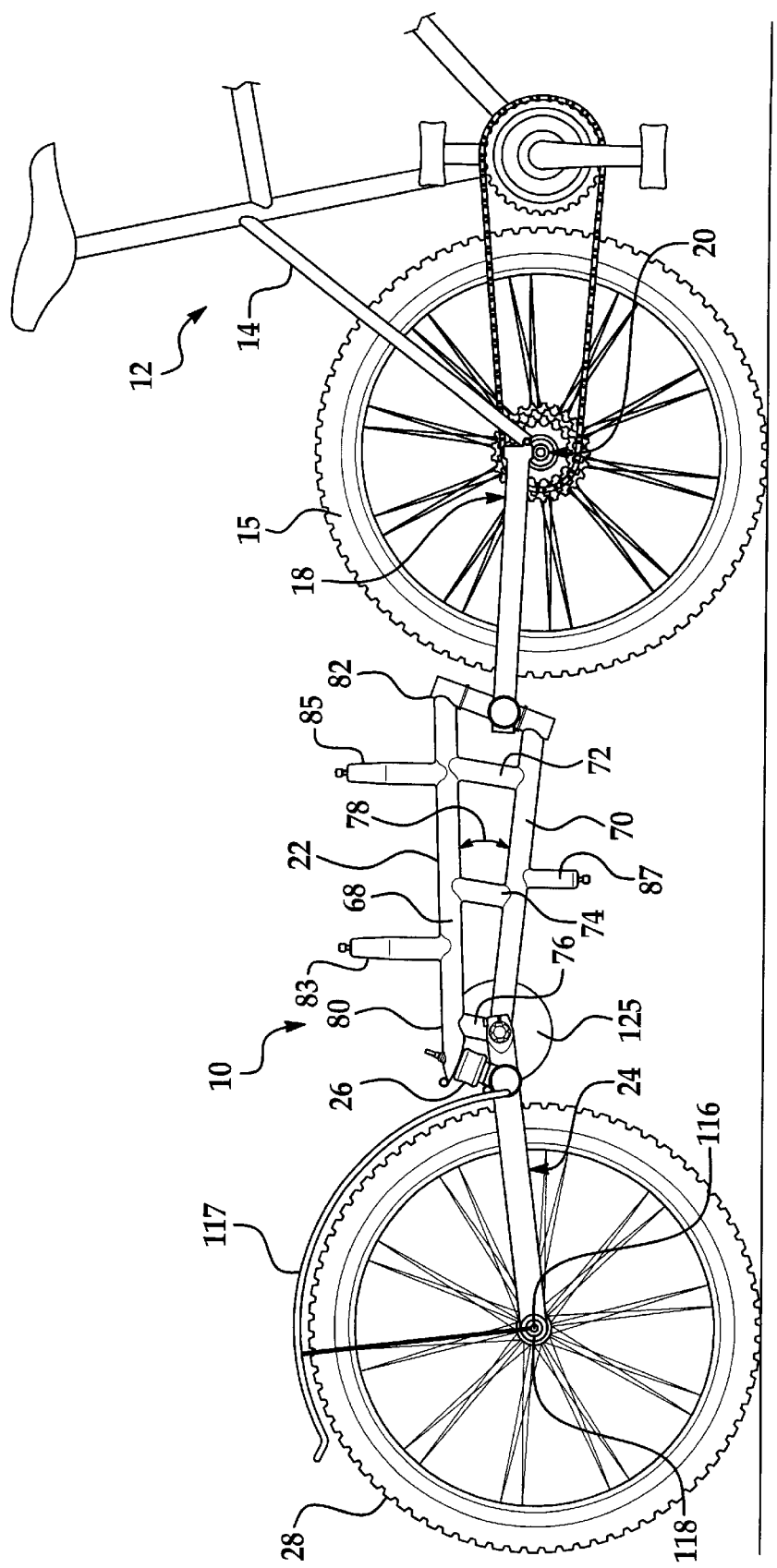
FIG. 1 is a side view of a bicycle trailer assembly which is made in accordance with the teachings of a first embodiment of the invention and which is attached to a bicycle.

As shown best in FIG. 1, frame or support member 22 includes a generally elongated top tube or member 68 and a generally elongated bottom tube or member 70 which are coupled together by use of three generally upright cross members 72, 74, and 76 which are connected to tubes 68, 70 in a conventional manner (e.g., welded). Tubes 68, 70 diverge at an angle 78 from the rear portion 80 of the frame 22 to the front portion 82 of frame 22. Frame 22 also includes upwardly extending tubes 83, 85 which are fixedly coupled to and orthogonally project from tube 68, and a downwardly extending tube 87 which orthogonally projects from tube 70. As explained more fully and completely below, tubes 83, 85, and 87 allow for the attachment of panniers or receptacles 120 to frame 22.

As shown best in FIG. 4, the front portion 82 of frame 22 is pivotally coupled to fork 18. Particularly, the front ends of members 68, 70 respectively include split receiver tubes 84, 86 having selectively adjustable gaps (not shown). Each receiver tube 84, 86 may be selectively tightened and loosened by use of conventional bolt fasteners 88 in a manner substantially identical to that described in relation to tubes 48, 50. A cylindrical steering arm or member 90 passes through tubes 84, 86 and through tube 42 which contains an internal bushing or bearing (not shown). Receiver tubes 84, 86 are tightened, thereby frictionally engaging member 90 and causing member 90 to remain in position within tubes 84, 86. Member 90 is rotatable within member 42, thereby allowing frame 22 to rotate relative to fork 18 about the axis 44 in the directions of arrows 92. Due to the acute angle 46, the steering of trailer 10 is desirably "tight," thereby reducing the tendency of the trailer 10 to move laterally (e.g., from side to side) and giving the rider more control over the bicycle 12. Furthermore, the angle allows for relatively "tight" or "sharp" turns to be made without losing control of the bicycle or trailer assembly. That is, the angle 46 causes the trailer wheel 28 to "carve" a path in conformity with the path of the bicycle 12 as it turns.

Figure 3:
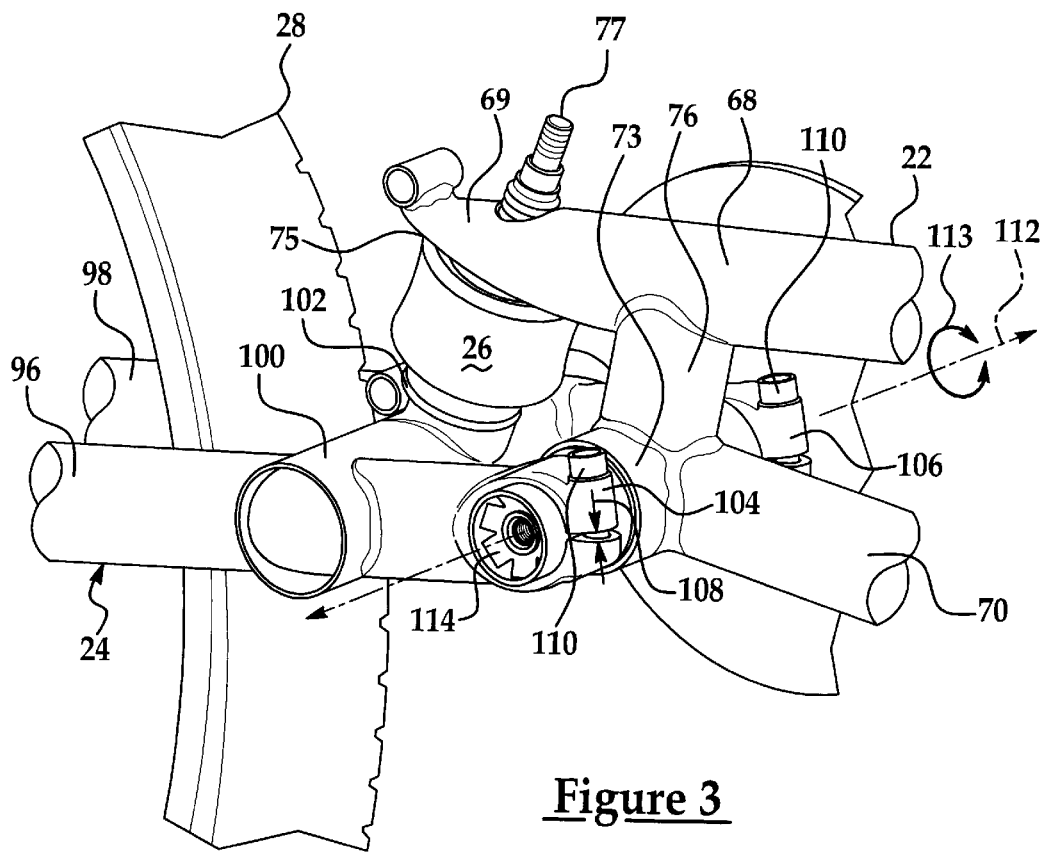
FIG. 3 is a partial perspective view of the bicycle trailer assembly shown in FIG. 1 and illustrating the coupling of the rear yoke of the trailer assembly to the support frame of the trailer assembly.

As shown best in FIG. 3, in rear portion of frame 22, upper tube 68 includes a portion 69 which projects beyond cross member 76, and includes a flat bottom surface 75 which is coupled to elastomeric member or shock absorber 26 in a conventional manner (e.g., by use of a conventional fastener 77). Lower tube 70 and upright cross member 76 are joined by and/or are welded to a generally horizontal tube 73 which serves as a pivot joint for the rear yoke 24.

As shown best in FIGS. 2 and 3, rear yoke 24 includes a pair of relatively thick hollow members or tubes 96, 98, which are fixedly coupled in a conventional manner (e.g., welded) to a cross member or tube 100 which connects tubes 96, 98. Cross member 100 includes a raised portion or surface 102 which is coupled to shock absorbing member or assembly 26 in a conventional manner.

Rear fork 24 is pivotally coupled to frame 22, and more particularly is pivotal about a substantially horizontal axis 112 which passes through the center of tube 73. The front ends of tubes 96, 98 respectively include split receiver tubes 104, 106 having selectively adjustable gaps 108. Each receiver tube 104, 106 may be selectively tightened and loosened by use of conventional bolt fasteners 110 which allow the diameter of the tubes 104, 106 or the size of gaps 108 to be selectively adjusted (i.e., increased and decreased). A cylindrical pivoting member, shaft or dowel 114 passes through tube 73 which contains an internal bushing or bearing (not shown). Receiver tubes 104, 106 are tightened, thereby frictionally engaging shaft 114 and causing shaft 114 to remain in position within tubes 104, 106.

In the preferred embodiment of the invention, the shock absorbing member 26 comprises a hollow elastic member which is filled with a gaseous or fluid material, which may be selectively compressed and expanded as rear yoke 24 pivots relative to frame 22. Particularly, as shown in FIG. 3, member 26 is disposed between yoke 24 and frame 22 is selectively compressed and "stretched" or expanded when yoke 24 pivots relative to frame 22 in the directions of arrows 113, and provides forces which damp the movement of yoke 24 relative to frame 22. In other alternate embodiments, different types and/or numbers of shock absorbing members or resilient elements may be used or disposed between yoke 24 and frame 22.

The trailer wheel 28 is a conventional bicycle wheel, and in the preferred embodiment of the invention is substantially the same size or diameter as the rear wheel 15 and the front wheel (not shown) of bicycle 12. The large size of wheel 28 allows the trailer to better traverse large obstacles and uneven off-road terrain relative to prior trailer assemblies which use relatively small wheels. The size of wheel 28 also provides for interchangeability with the other wheels of the bicycle 12. Wheel 28 is coupled to fork 24 in a conventional manner (e.g., by use of conventional fasteners 118 which are attached to the axle 116 of wheel 28). A conventional mudguard or fender assembly 117 may also be attached to axle 116 in a conventional manner.

Referring now to FIG. 6, there is shown a pair of substantially identical panniers or receptacles 120, which may be selectively attached to frame 22 and used to transport cargo. Panniers 120 include generally hollow and cylindrical caps or sleeves 122, 124, and 126. Sleeves 122, 124 are fixedly attached to the upper portion of panniers 120 in a conventional manner (e.g., portions of sleeves 122, 124 and may be "sewn into" panniers 120 or attached by use of an adhesive or other conventional fastening mechanism). In one non-limiting embodiment, sleeves 122, 124 may be integrally formed with the upper portion of panniers 120. Sleeve 126 is fixedly attached to the bottom portion of panniers 120 by use of strap 128. Particularly, sleeve 126 is fixedly attached to the strap 128 in a conventional manner (e.g., portions of sleeve 126 may be "sewn into" strap 118 or attached by use of an adhesive or other conventional fastening mechanism), and strap 128 is fixedly attached to the bottom portion of panniers 120 in a conventional manner (e.g., strap 128 is sewn to the bottom portion of panniers 120). Each sleeve 122–126 includes a generally circular top 130 having an aperture 132. Sleeves 122, 124 conformingly fit over upwardly extending tubes 83, 85 respectively, and sleeve 126 conformingly fits over downwardly extending tube 87. Conventional threaded fasteners 134 which extend from tubes 83, 85 and 87 pass through apertures 132 when sleeves 122, 124, and 126 are respectively fitted over tubes 83, 85, and 87. Sleeves 122, 124, and 126 may then be respectively secured to tubes 83, 85 and 87 by use of conventional nut type fasteners 136 which may be screwed onto fasteners 134. Once nuts 136 have been tightened, panniers 120 are tightly secured to frame 22, and movement of the panniers is substantially prevented in both the upward and downward direction, thereby substantially the reducing the typical "upward and downward" loads that are transferred to the bicycle when travelling in an off-road environment.

As shown best in FIG. 1, generally circular discs 125 may be attached to each side of shaft 114 in a conventional manner. Discs 125 substantially prevent panniers 120 from "catching" or interfering with the pivotal movement of rear yoke 24.

It should be appreciated that the panniers 120 shown in FIG. 6 and the foregoing method and mechanisms for attaching panniers 120 to frame 22 in no way limit the scope of the invention, and in alternate embodiments, different types of panniers or cargo carrying receptacles may be used, and may be attached using any suitable method or mechanism. In one non-limiting embodiment, frame 22 may include an integrally formed or fixedly attached receptacle.

In operation, the movement and vibration that is encountered by the trailer assembly 10 is substantially damped and/or reduced by use of the independently suspended rear wheel 28 and yoke 24. Particularly, when rear wheel 28 encounters obstacles and/or surface variations typical within an "off-road" or other environment, it moves "up" and "down" and causes the rear yoke 24 of the trailer assembly 10 to pivot relative to the cargo carrying frame 22 of trailer 10 about the generally horizontal axis 122. As the rear yoke 24 pivots, the shock absorber or elastomeric member is selectively compressed and expanded, thereby damping and/or substantially reducing vibrations and loads caused by the obstacles or variations, and preventing such vibrations and loads from being transferred to the bicycle 12. Furthermore, because shock absorber 26 absorbs most of the force and stress caused by the rear wheel 28 encountering obstacles and uneven terrain, the forces imparted upon the joints 20 which attach the trailer to the bicycle 12 are substantially reduced relative to prior trailer assemblies, thereby substantially reducing deterioration of the joints 20. The relatively large size of wheel 28 further ensures that the trailer 10 will be able to traverse relatively large obstacles and surface variations. The robust ball joint attachments 20 provide a secure and durable connection to the bicycle 12 and allow the entire trailer assembly 10 and frame 22 to pivot about a horizontal axis 60 relative to the bicycle 12. In this manner, trailer assembly 10 provides two independent horizontal pivot points or axes 112 and 60 which allow for better stability, performance and handling. Ball joint assemblies 20 further prevent lateral and/or vertical "slop" and/or movement between the trailer 10 and the bicycle 12. Particularly, the ball joints 20 allow for smooth and controlled movement between the front yoke 18 and bicycle 12, as the ball sockets 54 may pivot, to a certain degree, in any direction relative to the ball studs 56. This greatly reduces the fatigue on skewer pins 64, bicycle axle 16 and axle draw bolt 13. Moreover, the trailer steering axis 44 is disposed at an acute angle 46 which provides for desirably "tight" steering performance, thereby reducing the tendency of the trailer 10 to move laterally (e.g., from side to side) and giving the rider more control over the bicycle 12 and trailer 10. While the advantages of trailer 10 are discussed in relation to "off-road" use, it should be appreciated that the trailer 10 will provide similar benefits when used "on-road" or in any other environments.

Figure 7:
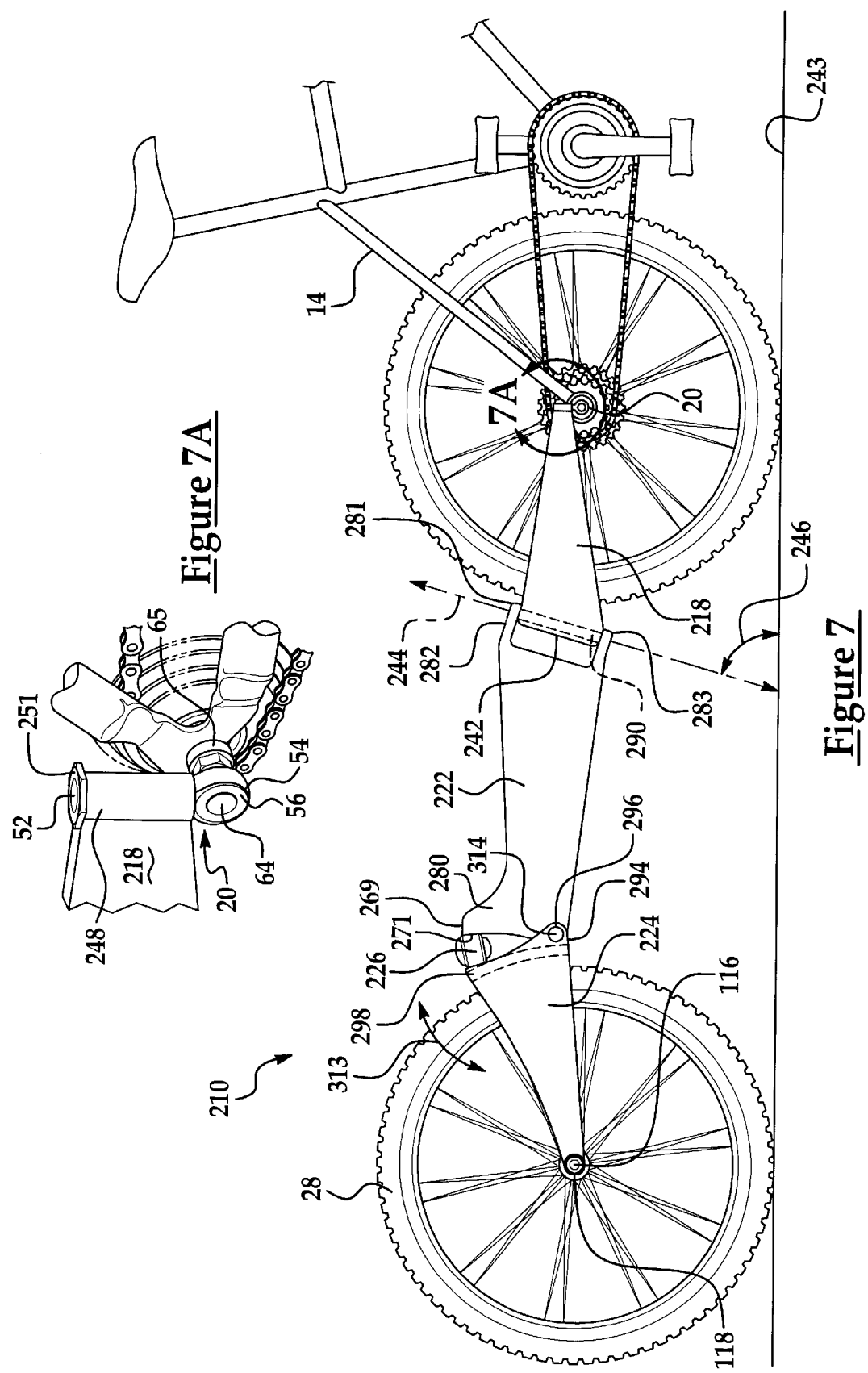
FIG. 7 is a side view of a bicycle trailer assembly which is made in accordance with the teachings of a second embodiment of the invention and which is attached to a bicycle.
Figure 8:
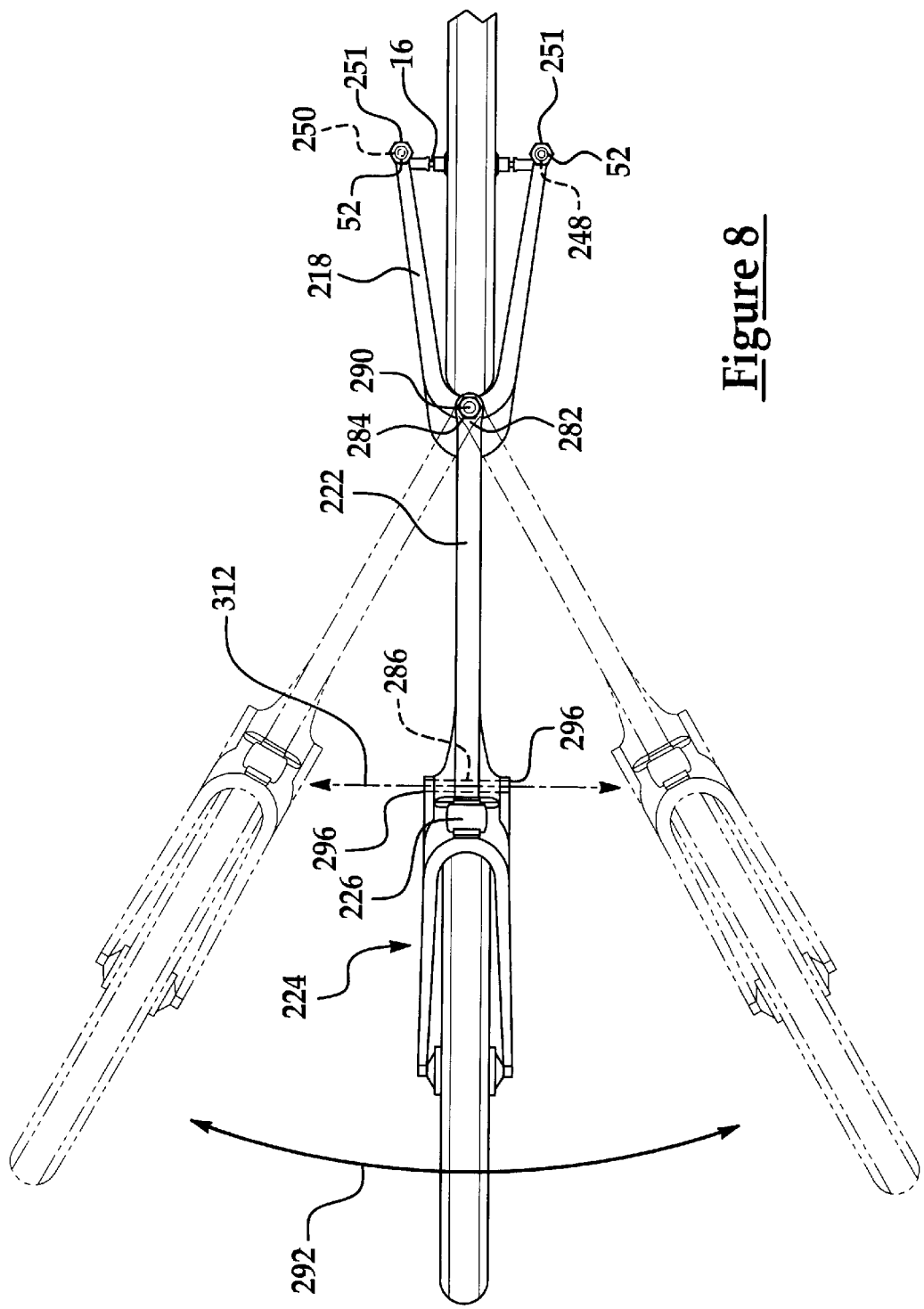
FIG. 8 is a top view of the bicycle trailer assembly shown in FIG. 7.

Referring now to FIGS. 7–8, there is shown a trailer assembly 210 which is made in accordance with the teachings of a second embodiment of the invention and which is adapted to be selectively attached to the frame 14 and rear axle 16 of the bicycle 12. Other than the differences delineated below, trailer assembly 210 is substantially identical in structure and function to trailer assembly 10. Trailer assembly 210 has a simplified design and is manufactured from a composite material, such as carbon fiber. As shown, bicycle trailer assembly 210 includes a front yoke 218, which is pivotally coupled to the rear axle 16 of bicycle 12 by use of ball-type joint assemblies 20; a cargo support or carrying frame 222 which is pivotally coupled to front yoke assembly 218 about a generally vertical "steering" axis 244; and a rear yoke assembly 224 which is pivotally coupled to frame 222 about a generally horizontal axis 312, and which rotatably supports a trailer wheel 28. Trailer assembly 210 further includes an elastomeric member, resilient element, shock absorber or damper 226 which is operatively disposed between frame 222 and rear yoke 224. Storage compartments or panniers may be selectively attached to frame 222 in a conventional manner (e.g., by use of straps, cords or other attachment mechanisms).

In this embodiment, front yoke 218, frame 222 and rear yoke 224 are formed and/or molded from a synthetic or composite material, such as carbon fiber. Front yoke 218 is generally "U"-shaped and includes a generally hollow angled portion 242 which is disposed at an acute angle 246 relative to the ground surface 243. The front ends or "prongs" of yoke 218 respectively include hollow receiver tubes 248, 250. Receiver tubes 248, 250 are adapted to fit over rod ends 52 of the ball joint assemblies 20, as shown best in FIG. 7a.

Front yoke 218 is coupled to axle 16 by use of ball joints 20. As shown best in FIG. 7a, in this embodiment, the tip of each rod end 52 protrudes from receiver tubes 248, 250 and is threaded. A conventional fastener 251 (e.g., a hex nut) is threaded onto each rod end 52, thereby securing receiver tubes 248, 250 to the rod ends 52 and securing the front yoke 218 to the ball joints 20.

As shown best in FIG. 1, frame or support member 222 is generally rectangular and includes a generally "C"-shaped front end 282 and a rear end 280. The "C"-shaped front end 282 of frame 222 is pivotally coupled to fork 218. Particularly, the top and bottom projections 281, 283 of front end 282 each includes a substantially identical aperture 284. Each aperture 284 receives a cylindrical steering arm or member 290 that passes through apertures 284 and through hollow portion 242 of yoke 218 which contains an internal bushing or bearing (not shown). Member 290 is frictionally secured within apertures 284 and is rotatable within member 242, thereby allowing frame 222 to rotate relative to fork 218 about the axis 246 in the directions of arrows 292. Due to the acute angle 246, the steering of trailer 210 is desirably "tight," thereby reducing the tendency of the trailer 210 to move laterally (e.g., from side to side) and giving the rider more control over the bicycle 12. As discussed relative to trailer 10, the acute angle 246 allows for relatively "tight" or "sharp" turns to be made without losing control of the bicycle or trailer assembly.

The rear portion 280 of frame 222 includes an upwardly projecting portion 269 having a generally flat back surface 271 which is coupled to elastomeric member or shock absorber 226 in a conventional manner. The bottom of rear portion 280 of frame 222 is flared and includes a hollow channel 286 which receives a dowel member and serves as a pivot joint for the rear yoke 224.

Rear yoke 224 has a generally "U"-shaped tapered body. Rear fork 224 is pivotally coupled to frame 222, and more particularly is pivotal about a substantially horizontal axis 312 which passes through the center of channel 286. The bottom 294 of the widened front portion of rear yoke 224 is split and includes a pair of substantially identical apertures 296. A cylindrical pivoting member, shaft or dowel 314 passes through apertures 296 and channel 286 which contains an internal bushing or bearing (not shown).

In the preferred embodiment of the invention, the shock absorbing member 226 is substantially identical to member 26. Member 226 is coupled to the top portion 298 of yoke 224 and is selectively compressed and expanded as rear yoke 224 pivots relative to frame 222. Particularly, as shown in FIG. 7, member 226 is disposed between the top portion 298 of yoke 224 and the upper projection 269 of frame 222 and is selectively compressed and "stretched" or expanded when yoke 224 pivots relative to frame 222 in the directions of arrows 313, and provides forces which damp the movement of yoke 224 relative to frame 222. In other alternate embodiments, different types and/or numbers of shock absorbing members or resilient elements may be used or disposed between yoke 224 and frame 222.

The trailer wheel 28 is a conventional bicycle wheel, and is coupled to fork 24 in a conventional manner (e.g., by use of conventional fasteners 118 which are attached to the axle 116 of wheel 28).

In operation, trailer assembly 210 functions substantially similar to trailer assembly 10. Particularly, the movement and vibration that is encountered by the trailer assembly 210 is substantially damped and/or reduced by use of the independently suspended rear wheel 28. Particularly, when rear wheel 28 encounters obstacles and/or surface variations typical within an "off-road" or other environment, it moves "up" and "down" and causes the rear yoke 224 of the trailer assembly 210 to pivot relative to the cargo carrying frame 222 of trailer 210 about the generally horizontal axis 312. As the rear yoke 224 pivots, the shock absorber or elastomeric member 226 is selectively compressed and expanded, thereby damping and/or substantially reducing vibrations and loads caused by the obstacles or variations, and preventing such vibrations and loads from being transferred to the bicycle 12. Furthermore, because shock absorber 226 absorbs most of the force and stress caused by the rear wheel 28 encountering obstacles and uneven terrain, the forces imparted upon the joints 20 which attach the trailer to the bicycle 12 are substantially reduced relative to prior trailer assemblies, thereby substantially reducing deterioration of the joints 20.

It is understood that the invention is not limited by the exact construction or method illustrated and described above but that various changes and/or modifications may be made without departing from the spirit and/or the scope of Applicants' inventions.

What is claimed is:

1. A bicycle trailer for use with a bicycle having a rear axle and a frame, said bicycle trailer comprising:

a front yoke having a first portion and a second portion, said first portion being adapted to pivotally couple to a rear axle of a bicycle about a first generally horizontal axis;

a pair of ball joint assemblies which pivotally couple said first portion to a rear axle of a bicycle, said ball joint assemblies including a draw pin which includes a first end which is threadingly attached to said rear axle and a second end; a ball stud which is fixedly attached to said second end; a skewer which is threadingly attached to said draw pin and which is adapted to abuttingly engage a portion of a frame of a bicycle, effective to divert loads to said frame of said bicycle; and a ball socket which rides upon said ball stud and which is attached to said front yoke, and said second portion having a pair of substantially identical apertures which are separated by a hollow portion;

a steering arm which is rotatably disposed through said pair of substantially identical apertures and within said hollow portion;

a support frame having a first portion which is attached to said steering arm, thereby allowing a bicycle frame to be rotatable relative to said front yoke about a generally vertical axis, and a second portion having a generally horizontal channel;

a pivoting member which is rotably disposed within said generally horizontal channel;

a rear yoke having a first portion which is attached to said pivoting member, thereby allowing said rear yoke to pivot relative to said support frame about a generally horizontal axis, and a second portion;

a rear wheel which is rotatably coupled to said second portion; and a shock absorbing member which is operatively coupled to said rear yoke and to said support frame and which is effective to damp movement of said rear yoke relative to said support frame.

2. The bicycle trailer of claim 1 wherein said generally vertical axis forms an acute angle with said first portion of said front yoke.

3. A trailer for use with a bicycle of the type having a rear axle, said trailer comprising:

a front yoke having a first member and a second member, each of which is pivotally coupled to a unique end of said axle by use of a ball joint assembly, and a connecting portion which connects said first member to said second member and which includes pair of substantially identical apertures which are separated by a hollow portion;

a steering member which is rotatably disposed through said pair of substantially identical apertures and within said hollow portion;

a support frame having a top and a bottom generally elongated tube which are connected together by use of a plurality of cross members, said support frame further including a front end portion having a first projecting portion which is coupled to a top end of said steering member and second projecting portion which is coupled to a bottom end of said steering arm, thereby allowing said support frame to be rotatable relative to said front yoke about a generally vertical axis, and a rear end portion having a horizontal channel and a third projecting portion having a first surface and being disposed above said generally horizontal channel;

a pivot arm which is rotatably disposed within said generally horizontal channel;

a rear yoke having a front end portion which is attached to said pivot arm, thereby allowing said rear yoke to pivot relative to said support frame about a generally horizontal axis, said rear yoke further having a second surface and a rear end portion;

a rear wheel which is rotatably coupled to said rear end portion;

a shock absorber which is operatively disposed between said first surface and said second surface, and which is effective to damp movement of said rear yoke relative to said support frame;

at least one first member which is attached to said top generally elongated tube and which projects upward from said top generally elongated tube;

at least one second member which is attached to said bottom generally elongated tube and which projects downward from said bottom generally elongated tube; and at least one pannier including at least one top sleeve portion and at least one bottom sleeve portion which selectively and respectively attach to said at least one first member and to said at least one second member, thereby securing said at least one pannier to said support frame.

4. The trailer of claim 3 wherein said support frame is formed from a composite material.

* * * * *